(12) United States Patent
Faller

(10) Patent No.: US 7,055,867 B2
(45) Date of Patent: Jun. 6, 2006

(54) BRAKE SERVO COMPRISING A CONNECTING ELEMENT WITH A DEFINED ANGULAR POSITION

(75) Inventor: Jürgen Faller, Kahl (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 250 days.

(21) Appl. No.: 10/472,166

(22) PCT Filed: Feb. 27, 2002

(86) PCT No.: PCT/EP02/02059

§ 371 (c)(1),
(2), (4) Date: Sep. 17, 2003

(87) PCT Pub. No.: WO02/076802

PCT Pub. Date: Oct. 3, 2002

(65) Prior Publication Data
US 2004/0083884 A1    May 6, 2004

(30) Foreign Application Priority Data

Mar. 21, 2001   (DE) ............................. 101 13 910
May 11, 2001   (DE) ............................. 101 22 952

(51) Int. Cl.
  *F16L 27/00* (2006.01)
(52) U.S. Cl. ............... 285/189; 285/204; 285/914; 92/163
(58) Field of Classification Search ........... 285/189, 285/211, 202–204, 192, 81, 914; 92/163
See application file for complete search history.

(56) References Cited

U.S. PATENT DOCUMENTS 4,195,661 A   4/1980  Takeuchi
4,882,980 A * 11/1989  Arino et al. .................... 92/48
5,224,410 A    7/1993  Graichen et al.
5,305,606 A *  4/1994  Schonlau et al. ........... 60/547.1
5,697,283 A * 12/1997  Schluter .................... 91/369.1

FOREIGN PATENT DOCUMENTS

| DE | 3313320 C1  | 12/1984 |
| DE | 4116779 A1  | 11/1992 |
| DE | 19619954 A1 | 11/1997 |
| DE | 19621321 A1 | 12/1997 |
| DE | 10008795 A1 |  9/2001 |

OTHER PUBLICATIONS

Patent Abstract of Japanese No. JP 00071970 A; Application No. 10259273 dated Aug. 29, 1998, Applicant: Bosch Braking Systems CO, Title; Device for Attaching Vacuum Detecting Sensor.
German Search Report of Application No. 101 22 952.6 dated Sep. 7, 2001.
International Search Report of Application No. PCT/EP02/02059 dated Jul. 2, 2002.

* cited by examiner

*Primary Examiner*—Aaron Dunwoody
(74) *Attorney, Agent, or Firm*—RatnerPrestia

(57) ABSTRACT

The present invention relates to a brake booster with at least one booster housing section including an opening into which a sealing element made of a flexible material is mounted, said sealing element including a recess into which a pneumatic connecting element, in particular for the vacuum supply of the brake booster, is slidable. An object of the present invention is to precisely define the exit portion of a deflected connecting element in its rotational position relative to the housing of the booster in order to simplify and improve the assembly. This object is achieved in that associated projections and recesses are used to ensure that the connecting element can only be mounted into the sealing element at the correct angle.

10 Claims, 6 Drawing Sheets

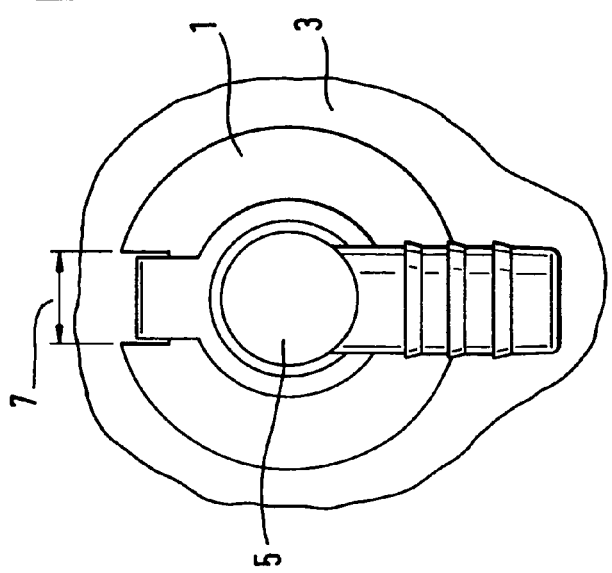
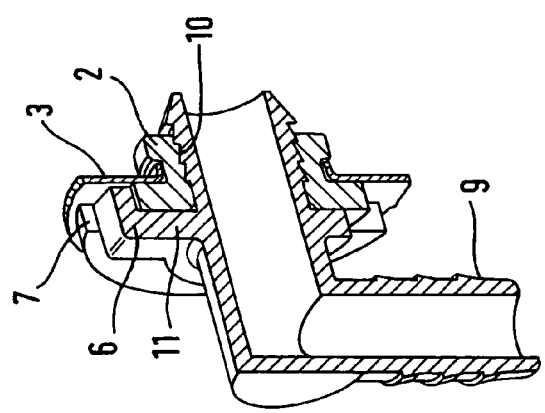
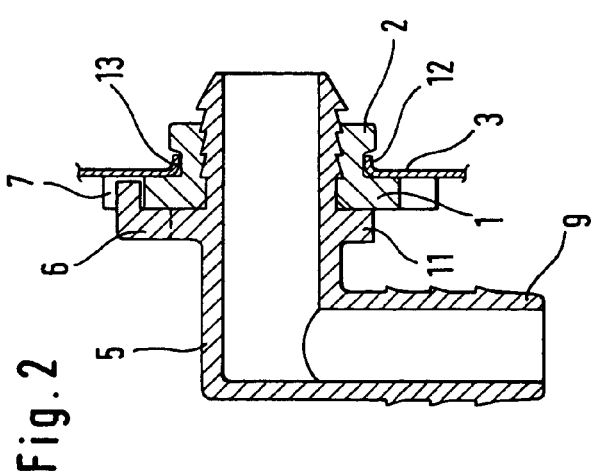

BRAKE SERVO COMPRISING A CONNECTING ELEMENT WITH A DEFINED ANGULAR POSITION

TECHNICAL FIELD

The present invention relates to a brake booster for a motor vehicle with at least one booster housing section including an opening into which a sealing element made of a flexible material is mounted, said sealing element including an opening into which a pneumatic connecting element, in particular for the vacuum supply of the brake booster, is slidable.

BACKGROUND OF THE INVENTION

A brake booster of this type is e.g. disclosed in the applicant's Brake Handbook, edition 9.1, page 101, FIGS. 1 to 3. Said booster comprises at least one booster housing section with an opening housing a sealing element made of a flexible material and including a pneumatic connection that can be slid into a recess of the sealing element. Said pneumatic connection may e.g. be a simple pneumatic connection or a construction unit composed of a pneumatic connection with an integrated non-return valve. The connection is preferably used for the vacuum supply of the brake booster.

Various car manufacturers fit the pneumatic connection in their own premises for different reasons. Due to space problems it is necessary that the connecting element extending at an angle in many cases is mounted in a defined angular position in order that the supply conduits are safely connected, rubbing or scuffing on other assemblies in the engine compartment is prevented, and technical problems or space problems are ruled out.

BRIEF SUMMARY OF THE INVENTION

In view of the above, an object of the present invention is to provide a brake booster that permits being completed, with low effort, only in the plant of the car manufacturer, meaning that it can be equipped with the necessary pneumatic connections, and the direction of the exit portion of the connecting hoses is exactly predefined.

This object is achieved according to the present invention in that the sealing element includes at least one first projection or one first recess and that the connecting element is provided with at least one second recess or second projection associated with the first projection or the first recess in such a manner that the associated projections and recesses engage each other only in a defined angular position between sealing element and connecting element, thereby allowing lock-type jointing of the sealing element and connecting element. Thus, the solution of the object of the invention principally resides in providing the connecting element and the sealing element with respectively associated projections and recesses so that they fit to one another only in a defined angular position of the connecting element relative to the sealing element. Only in this position is it possible to joint the two parts, for example, by locking them. Not only do the features of the invention render it possible to prevent jointing the connecting element and the sealing element at a wrong angle. Additionally, the two last mentioned components are also secured against twisting because engaging projections and recesses achieve undercutting surfaces that prevent the two components from twisting in relation to each other.

An improvement of the invention to enhance the torsional strength of the connecting element with respect to the housing of the brake booster and also secure the angularly correct mounting position of the sealing element in relation of the housing of the brake booster is achieved in that the sealing element includes in each case at least one third projection or one third recess, and that the opening includes at least one associated fourth recess or fourth projection in such a manner that the associated projections and recesses engage each other only in a defined angular position between sealing element and opening, thereby allowing jointing the sealing element and the opening.

A second, equivalent solution of the object of the invention is achieved in that the booster housing section includes at least one first projection or one first recess, and that the connecting element includes at least one second recess or second projection associated with said first projection or said first recess in such a fashion that the associated projections and recesses engage each other only in a defined angular position between the booster housing part and the connecting element, thereby allowing jointing the sealing element and the connecting element. This solution principally involves providing the connecting element and the housing section with respectively allocated projections and recesses so that these fit together only in a defined angular position of the connecting element relative to the housing section. Only in this position is it possible to joint the sealing element and the connecting element, e.g. by locking, because the connecting element can be inserted sufficiently deeply into the sealing element only in this angular position. With the features of the invention, it is not only possible to prevent jointing the connecting element and housing section at a wrong angle. The two last mentioned components are additionally secured against twisting relative to each other because engaging projections and recesses achieve undercutting surfaces that prevent the two components from twisting relative to each other. The anti-rotation mechanism of the connecting element relative to the housing also determines the angular position of the exit portion of the connecting element.

The recess in the housing section is offset relative to the center line of the opening in the housing section. In this arrangement, the recess in relation to the center line may basically be offset in circumferential direction or in radial direction. When the recess extends in circumferential direction, it is advisable for the recess to have a trough-shaped configuration because in this case the material of which the housing section is made will not deform considerably. Another favorable improvement with respect to the arrangement for the recess is in that the housing section is substantially bowl-shaped, wherein opening is provided in the bottom of the bowl and wherein the recess in the housing section is now arranged radially offset relative to the opening. For example, the arrangement may be placed in the area of a circumferential depression in the housing section. It is recommended in a favorable improvement of the invention to arrange the recess at the housing section radially outside in the fringe area of the bottom. This applies in particular when the recess is arranged radially outside at the bottom in such a manner that it extends until the abutting surface between the bottom and the peripheral surface of the bowl because this particularly minimizes the deformation work in the housing section.

BRIEF DESCRIPTION OF THE DRAWINGS

FIG. 1 is a top view of a cutout of the housing with an inserted sealing element and connecting element.

FIG. 2 is a section taken through the arrangement of FIG. 1 in the center plane of the angled connecting element.

FIG. 3 is a perspective view of the section taken through the illustration of FIG. 2.

DETAILED DESCRIPTION OF THE PREFERRED EMBODIMENTS

Figure 6:
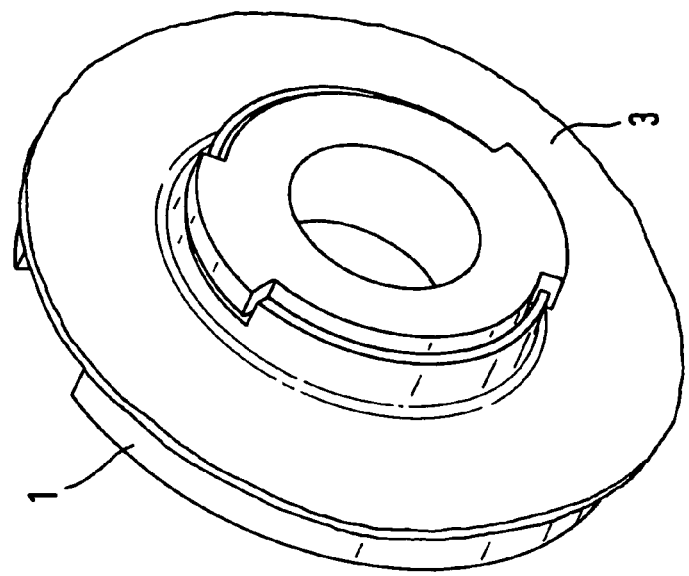
FIG. 6 shows the connection of the sealing element and housing section according to FIGS. 4 and 5.

FIG. 1 shows a top view of a cutout of housing 3 of the brake booster in which sealing element 1 is inserted, with connecting element 5 inserted in turn into sealing element 1. Connecting element 5 has an angled exit portion 9 which shall be mounted in a predetermined angular position of its longitudinal axis with respect to the housing 3, as defined in the object of the invention.

The desired rotational position of the connecting element 5 in relation to the sealing element 1 is achieved by means of a second projection 6 engaging an associated first recess 7 in the sealing element 1. The second projection 6 configured as a projecting nose is designed to have such a length that safe locking is only possible if the nose 6 engages the recess 7. The sealing element and the connecting element are lockable relative each other by means of prong-shaped projections 10. A console 11 at the connecting element 5 determines the distance of the connecting element from the sealing element 1 and, hence, from the housing 3. Housing 3 includes a rim 12 formed inwards and confining opening 13. This improves taking up radial forces, without cutting the sealing element. Furthermore, this increases the mutual radial abutment surface of sealing element and housing 3, thereby improving the frictional engagement against twisting.

Figure 5:
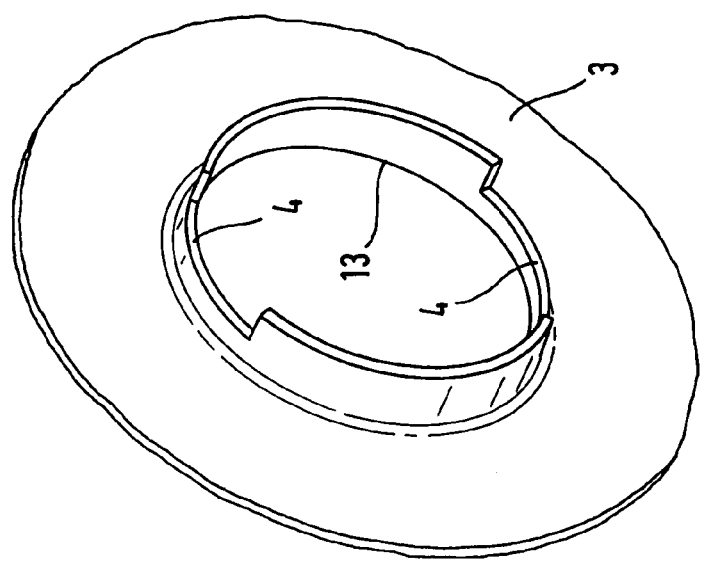
FIG. 5 is a cutout of the housing, viewed from the inside.
Figure 4:
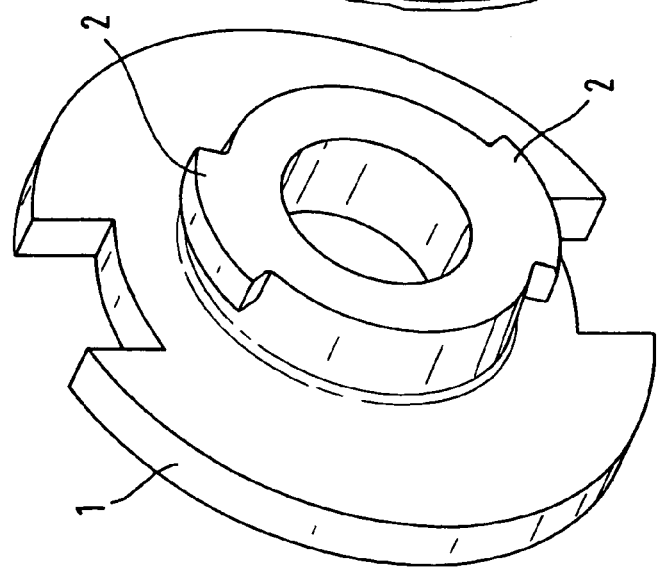
FIG. 4 is a perspective view of the sealing element, as seen from the housing.

FIGS. 4 to 6 show a cutout of the housing 3, the sealing element 1, as well as the connection between these two elements. Sealing element 1 is equipped with two opposed, symmetrically designed third projections 2 that are appropriate to engage associated third recesses 4 in housing 3. FIG. 6 shows the two jointed elements that are protected against twisting relative to one another by engagement of third projections in third recesses. Of course, the third recesses and projections can be configured so that only one single mutual angular position permits connecting the two above-mentioned elements. This may e.g. be forced by the provision of only one single third projection and one single associated third recess, or by the unsymmetrical arrangement of third projections and recesses over the periphery of opening 13.

Figure 8:
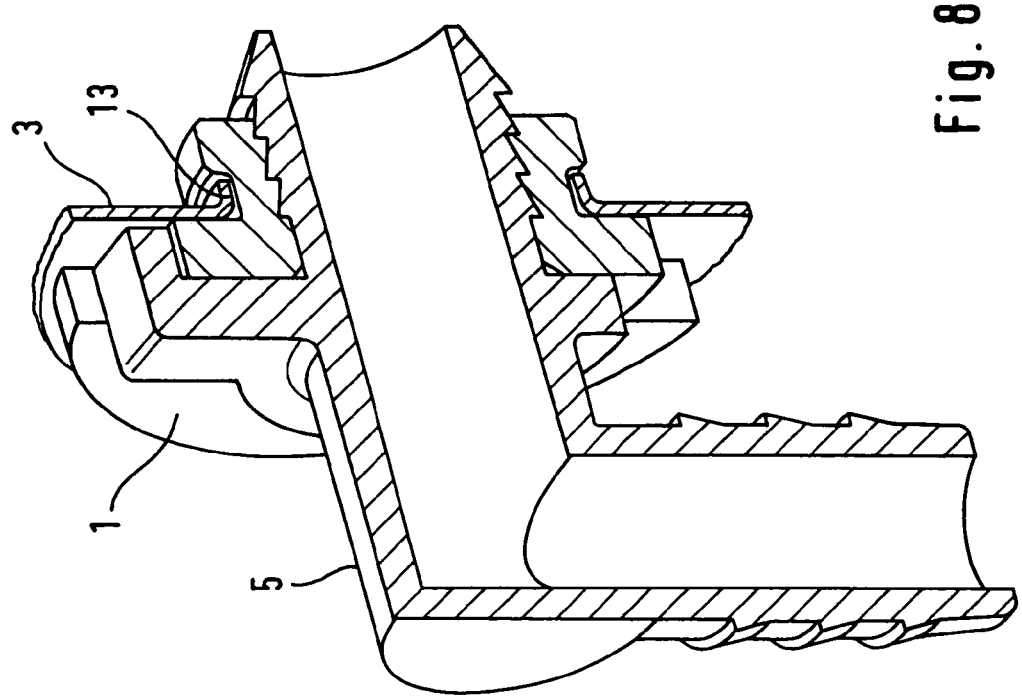
FIG. 8 is a cross-section taken through the connection of FIG. 7.
Figure 7:
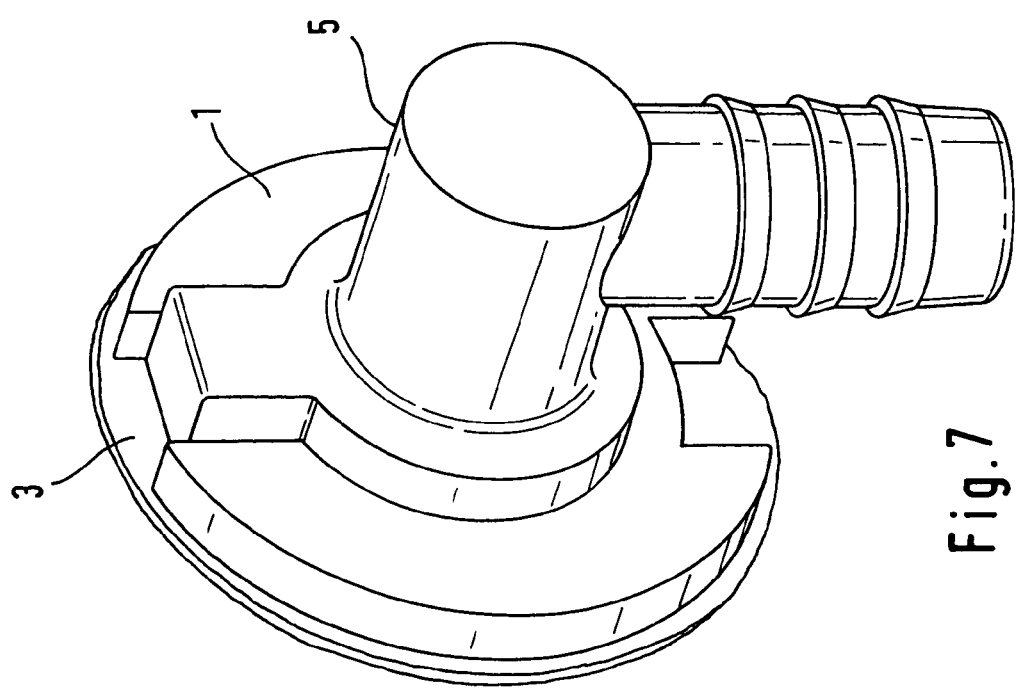
FIG. 7 shows the connection of the connecting element, sealing element, and housing.

Finally, FIGS. 7 and 8 show the assembly of housing 3 with sealing element 1 and connecting element 5. Corresponding provisions in the manufacture of the housing 3 including the sealing element permit ensuring that the sealing element is mounted in the housing only in one defined angular position, even if the third recesses of the sealing element are placed symmetrically for reasons of manufacture.

In an improvement of the invention, the connecting element may include a non-return valve or be configured as a connection piece of a hose.

Figure 9:
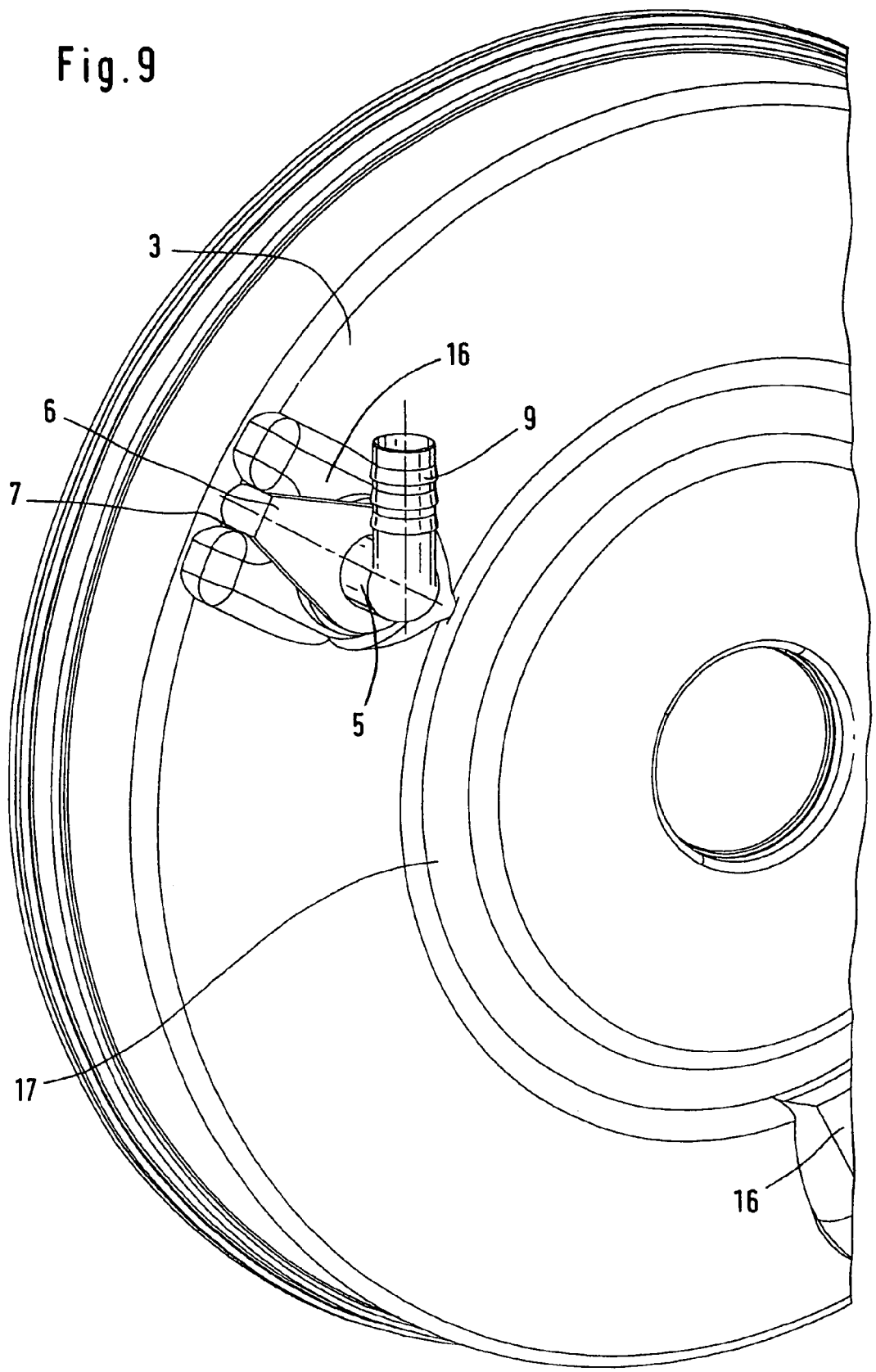
FIG. 9 is a cutout of a spatial illustration of the housing with a second embodiment.

FIG. 9 shows a perspective view of a cutout of part of housing 3, which is provided with a bulge 16. Several bulges of this type are arranged on the periphery of housing 3, e.g. in order to receive a sensor. The housing has substantially the shape of a bowl, with bulge 16 arranged at the edge of the bottom of the bowl. A recess 7 is shaped in bulge 16 so that said bulge generally has the shape of a U. A projection 6 of the connecting element 5 projects between the legs of the U-shaped bulge, the end of projection 6 being received in recess 7. Thus, the end of projection 6 is seized between the lateral walls of recess 7 so that the projection 6 can no longer rotate about the longitudinal axis of the connecting element 5, and the rotational position of the connecting element 5 is thereby defined. However, when the connecting position of the connecting element is defined, the angular position of the exit portion 9 is defined as well, which is integrally connected with projection 6.

It is also possible to seize the end of projection 6 in a recess that extends in a circumferential direction on the bottom of the housing. In this case, the recess in the housing should be shaped roughly like a trough.

Figure 10:
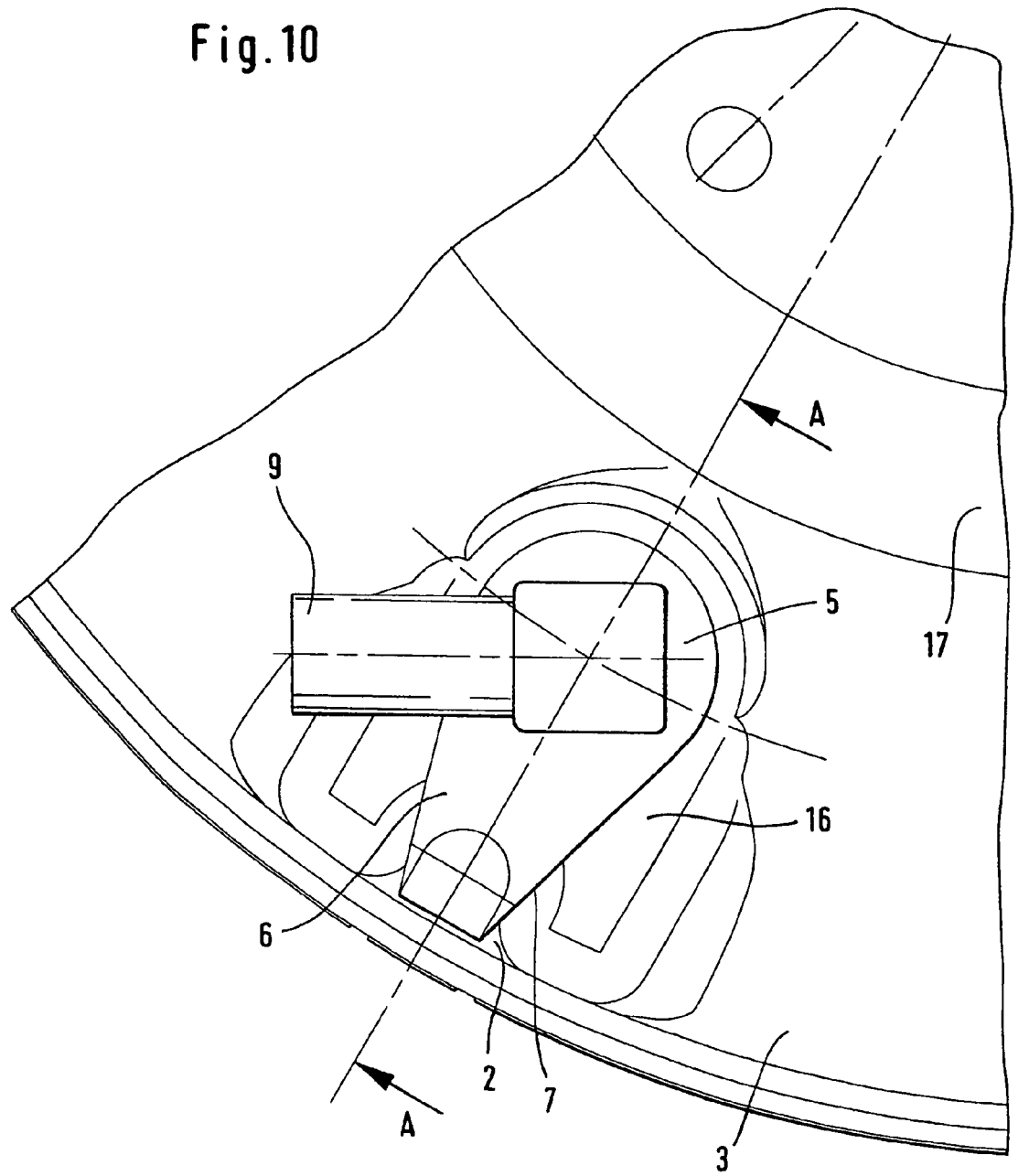
FIG. 10 is a top view of FIG. 9.

FIG. 10 shows an enlarged top view of the illustration of FIG. 9.

Figure 11:
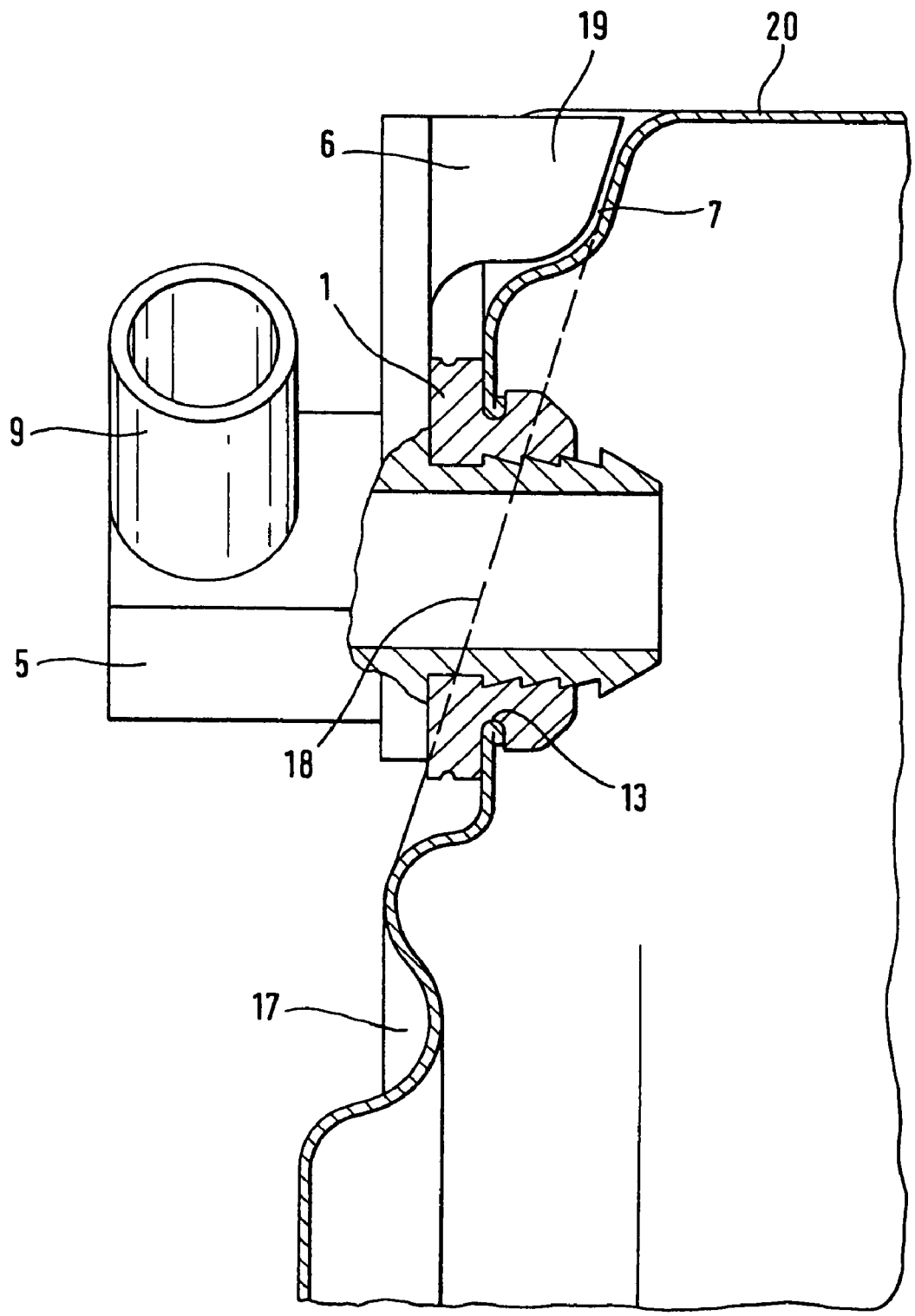
FIG. 11 is a cross-section taken along line A—A in FIG. 10.

FIG. 11 shows a cross-section taken along line of intersection A—A in FIG. 9. Corresponding to FIGS. 1 to 9, opening 13 in housing 3 can again be seen, into which sealing element 1 along with connecting element 5 is inserted. The anti-rotation mechanism in the present case is not established between the connecting element and the sealing element, but between the connecting element 5 and the housing 3. Line 18 indicates that the bottom of the housing 3 is per se conically inclined. Projection 6 still includes a nose 19 that protrudes into recess 7 of the housing. As the surroundings laterally of the recess 7 are much higher than the bottom of recess 7, it is possible to insert the connecting element 5 with the sealing element 1 into opening 13 only when the nose 19 plunges into recess 7. The rotational position of the connecting element 5 in relation to housing 3 is fixed this way.

FIGS. 9 to 11 still show a depression 17 that serves to reinforce the housing 3. It is per se also possible to add a recess corresponding to recess 7 to the depression and thereby define the rotational position of the connecting element 5. However, the deformation work necessary for producing the recess is considerably reduced at the chosen location close to the lateral wall 20 of housing 3 so that the recess is advantageously provided at this location. This is essentially achieved because the recess may be kept open towards the outside in this case, thereby obviating the need for a radially outwards disposed lateral wall of the recess.

The invention claimed is:

1. Brake booster with at least one booster housing section, said booster including a sealing element made of a flexible material, a pneumatic connecting element and an opening into which the sealing element is mounted, said sealing element including a hole into which the pneumatic connecting element is slidable, wherein the sealing element includes at least one first projection or one first recess and that the connecting element is provided with at least one second recess or second projection associated with the first projection or the first recess in such a manner that the associated projections and recesses engage each other only in a defined angular position between sealing element and connecting element, to lockingly engage the sealing element and connecting element in a fixed angular orientation relative to the booster housing section.

2. Brake booster as claimed in claim 1, wherein the sealing element includes in each case at least one third projection or one third recess, and that the opening includes at least one associated fourth recess or fourth projection in such a manner that the associated projections and recesses engage each other only in a defined angular position between sealing element and opening, thereby allowing jointing the sealing element and the opening.

3. Brake booster with at least one booster housing section, said booster including a sealing element made of a flexible material, a pneumatic connecting element and an opening into which a sealing element made of a flexible material is mounted, said sealing element including a hole into which the pneumatic connecting element is slidable, wherein one of the booster housing section and the sealing element consists of one first projection or one first recess, and that the connecting element consists of one second recess or second projection associated with said first projection or said first recess in such a fashion that the associated projections and recesses engage each other only in one angular position between the booster housing part and the connecting element, thereby allowing jointing the sealing element and the connecting element in only one angular orientation relative to the booster housing.

4. Brake booster as claimed in claim 3, wherein the housing section is substantially bowl-shaped, wherein opening is provided in the bottom of the bowl and wherein the recess in the housing section is now arranged radially offset relative to the opening.

5. Brake booster as claimed in claim 4, wherein the recess is arranged at the housing section radially outside in the fringe area of the bottom.

6. Brake booster as claimed in claim 5, wherein the recess is arranged radially outside at the bottom in such a manner that it extends until the abutting surface between the bottom and the peripheral surface of the bowl.

7. Brake booster as claimed in claim 6, wherein the recess forms a radially extending groove that is open in the direction towards the peripheral surface of the bowl.

8. Brake booster as claimed in claim 1 comprising a rim adjacent the opening in the booster housing section, said rim extending generally perpendicularly from the wall of the booster housing section and abutting the outer perimeter of the sealing element in frictional engagement to substantially limit rotation of the sealing element in the opening.

9. Brake booster comprising a booster housing section, a sealing element, a pneumatic connecting element and an opening into which the sealing element is mounted, said sealing element including a hole into which the pneumatic connecting element is slidably disposed, the sealing element including at least one first projection or one first recess and the connecting element including at least one second recess or second projection in corresponding alignment with the first projection or the first recess, the associated projections and recesses permitting locking engagement between the sealing element and connecting when the connecting element is positioned in only one angular orientation relative to the booster housing, and said associated projections and recesses preventing locking engagement between the sealing element and connecting when the connecting element is positioned in any other angular orientation relative to the booster housing.

10. Brake booster as claimed in claim 9 comprising a rim adjacent the opening in the booster housing section, said rim extending generally perpendicularly from the wall of the booster housing section and abutting the outer perimeter of the sealing element in frictional engagement to substantially limit rotation of the sealing element in the opening.

* * * * *